D. A. DUCHARME.
CLAMP.
APPLICATION FILED OCT. 19, 1908.
941,504.
Patented Nov. 30, 1909.
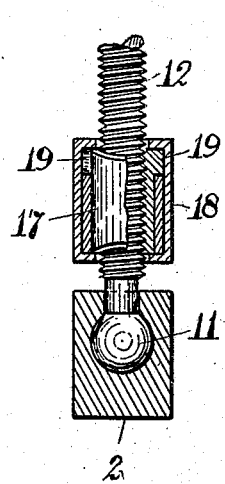
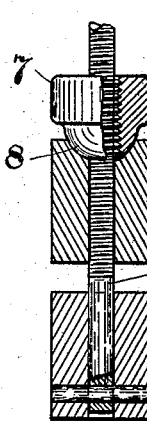
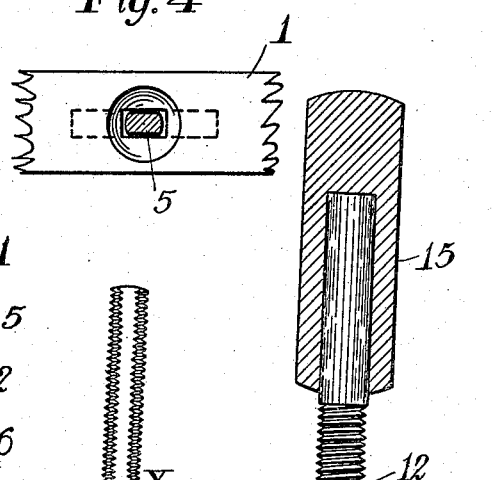
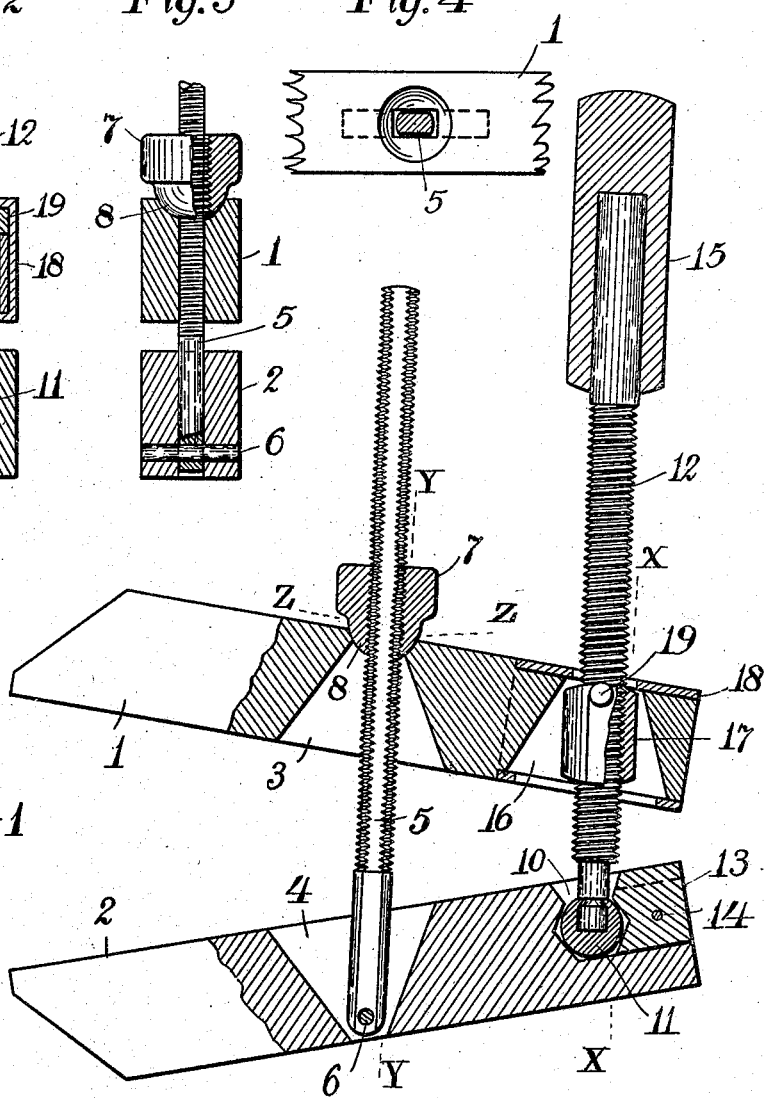
Witnesses;
E. H. Waite
Margaret L. Waite
Inventor,
David A. Ducharme;
By A. B. Upham,
Attorney.

UNITED STATES PATENT OFFICE.

DAVID A. DUCHARME, OF FITCHBURG, MASSACHUSETTS.

CLAMP.

941,504.      Specification of Letters Patent.      Patented Nov. 30, 1909.

Application filed October 19, 1908. Serial No. 458,397.

*To all whom it may concern:*

Be it known that I, DAVID A. DUCHARME, a citizen of the United States, and a resident of Fitchburg, in the county of Worcester and Commonwealth of Massachusetts, have invented a certain new and useful Improved Clamp, of which the following is a specification.

The object of this invention is the construction of a clamp which will take in work having non-parallel opposite faces; in which one member shall clear of all obstructions and will therefore permit of the clamp and its work being laid flat upon a supporting surface, and which will contain other improvements in details of construction hereinafter set forth.

Referring to the drawings forming part of this specification, Figure 1 is a side view mainly in section, of a clamp embodying my improvements. Fig. 2 is a sectional view of the same on the line X—X in Fig. 1. Fig. 3 is a sectional view on the line Y—Y in Fig. 1. Fig. 4 is a horizontal section of a part of the upper jaw on the line Z—Z in Fig. 1.

The reference numeral 1 designates what I term the upper jaw of the clamp, and 2, the lower jaw. At approximately mid-length of these jaws are the slots 3 and 4; the same being comparatively narrow and extending longitudinally of the jaws, as indicated by the dotted lines in Fig. 4, but much longer at the inner faces of the jaws than the outer ones, as shown in Fig. 1.

In the slot 4 is pivoted the unthreaded end of the bolt or screw 5, the pivotal point 6 being at the small end of the slot. This bolt rises through the slot 3 and is provided with a nut 7 having a semi-spherical nose 8 seated in a depression formed therefor in the jaw 1, as shown in Figs. 1 and 3. This bolt is planed off on faces parallel with the lateral faces of the jaws, and made of a width to snugly fit said slots; these smooth sides of the bolt serving to avoid the wear which would be caused in the slots by the screw threads; and also by their snug fit preserving the parallelism of the transverse lines of the two jaws.

In a socket 10 formed in the butt of the jaw 2 is seated the ball 11 terminally mounted on the screw 12; the socket being completed after the said ball has been introduced, by the insertion of the plug 13 fixed in place by a suitable pin 14. The opposite end of the screw 10 is provided with a handle 15 designed for forcibly turning the same. This screw penetrates a slot 16 in the butt of the jaw 1, and engages therein a nut 17 retained in place therein by a ferrule 18 whose top and bottom sides are slotted to permit the passage of the screw 12 but not the nut. This nut is held still further by trunnions 19, as shown in Figs. 1 and 2. The slots 3, 4 and 16 are shaped as illustrated in Fig. 1 in order to permit the angular adjustment of the jaws for which the structure is designed.

In using this clamp, the handle is held and the jaws whirled about on the screw 12 until the butts of the jaws have been brought to the required distance apart for the work to be fastened together. Then the nut 7, which is preferably roughened or milled, is rapidly rotated by running a finger along it, until the jaws are brought into perfect contact with the work. The handle 15 can now be forcibly turned until the jaws are made to apply the clamping-pressure required, and then placed upon the bench with the under surface of the jaw 2 resting flat thereon.

What I claim as my invention and for which I desire Letters Patent, is as follows, to wit:—

1. The combination of a pair of clamping jaws, a screw for pressing their butts apart, a screw pivoted at its end in an intermediate point of one jaw, and a nut turning on the last-named screw exterior to the other jaw and having a half-round nose, the jaw with which said nose contacts being correspondingly recessed to receive it.

2. The combination of a pair of clamping jaws, a screw having an operating handle for pressing their butts apart, a screw pivoted at its end in an intermediate point of one jaw, and a nut turning on the last-named screw exterior to the other jaw, the first-named screw having its extremity abutting in the same jaw as that in which the last-named screw is pivoted, and having its operating handle exterior to the other jaw and hence at the same side as the said nut.

3. The combination of a pair of clamping jaws, a screw for pressing their butts apart, a screw pivoted at its end in an intermediate point of one jaw, and a nut turning on the last-named screw exterior to the other jaw and having a half-round nose, the first-named screw and also the last-named one being adapted to swing relative to the jaws in a plane coinciding with the latter.

4. The combination of a pair of clamping jaws, a screw having an operating handle for pressing their butts apart, a screw pivoted at its end in an intermediate point of one jaw, and a nut turning on the last-named screw exterior to the other jaw and having a half-round nose, both screws being adapted to swing relative to the jaws in a plane coincident with the latter, and both said nut and the operating handle of the first-named screw being at the same side of the jaws.

5. The combination of a pair of clamping jaws, a screw for pressing together their operative ends, a screw for pressing apart the butts of said jaws and terminally seated in one of said jaws, and the butts of the other jaw being slotted, a nut in said slot for the last-named screw, and a ferrule surrounding the said slotted jaw-butt; said nut having a pair of trunnions at one end thereof close to one face of said ferrule, both said face and the one opposite thereto being suitably slotted for receiving the screw, and the ends of said nut being cylindrical to fit against the inner surfaces of said ferrule beside said slots.

6. The combination of a pair of clamping jaws, and screws for their adjustment, the screw at the butts of said jaws having a terminal ball, and the butt of one jaw being formed with a groove fitted to said ball, and having a correspondingly shaped plug fitted to said groove between said ball and the butt end of the jaw, and fastened therein.

In testimony that I claim the foregoing invention, I have hereunto set my hand this 5th day of October, 1908.

DAVID A. DUCHARME.

Witnesses:
AUSTIN H. PRENT,
FRANK L. MOSS.